United States Patent
Shaikh

(10) Patent No.: US 10,608,942 B1
(45) Date of Patent: Mar. 31, 2020

(54) REDUCING ROUTES BASED ON NETWORK TRAFFIC UTILIZATION

(71) Applicant: Amazon Technologies, Inc., Seattle, WA (US)

(72) Inventor: Ali Muhammad Shaikh, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/827,695

(22) Filed: Nov. 30, 2017

(51) Int. Cl.
| | |
|---|---|
| H04L 12/803 | (2013.01) |
| H04L 12/721 | (2013.01) |
| H04L 12/707 | (2013.01) |
| H04L 12/26 | (2006.01) |
| H04L 12/751 | (2013.01) |
| H04L 12/709 | (2013.01) |

(52) U.S. Cl.
CPC ........ *H04L 47/122* (2013.01); *H04L 43/0876* (2013.01); *H04L 45/22* (2013.01); *H04L 45/70* (2013.01); *H04L 47/125* (2013.01); *H04L 45/02* (2013.01); *H04L 45/245* (2013.01)

(58) Field of Classification Search
None
See application file for complete search history.

(56) References Cited

U.S. PATENT DOCUMENTS

| | | | | | |
|---|---|---|---|---|---|
| 6,061,679 | A * | 5/2000 | Bournas | ............ | G06F 17/30958 |
| 6,085,089 | A * | 7/2000 | Emmer | .................... | H04B 7/26 370/327 |
| 6,178,455 | B1 * | 1/2001 | Schutte | .................... | H04L 29/06 709/226 |
| 6,577,628 | B1 * | 6/2003 | Hejza | .................. | H04L 12/2856 370/392 |
| 6,618,757 | B1 * | 9/2003 | Babbitt | ............. | H04L 29/12283 370/431 |
| 6,795,709 | B2 * | 9/2004 | Agrawal | ........... | H04L 29/12283 370/331 |
| 6,920,116 | B1 * | 7/2005 | Hossain | .................. | H04L 29/06 370/254 |
| 6,957,276 | B1 * | 10/2005 | Bahl | .................... | H04L 61/2015 709/226 |
| 7,158,791 | B2 * | 1/2007 | Karino | .................... | H04L 45/00 370/217 |
| 7,197,549 | B1 * | 3/2007 | Salama | ............. | H04L 29/12283 709/223 |

(Continued)

*Primary Examiner* — Ayaz R Sheikh
*Assistant Examiner* — Tarell A Hampton
(74) *Attorney, Agent, or Firm* — Klarquist Sparkman, LLP

(57) ABSTRACT

Technologies are provided for managing routing updates for Internet Protocol (IP) addresses based on network traffic utilization. For example, a set of IP addresses can be obtained (e.g., IP addresses that are assigned to hosts). Network traffic utilization data can be obtained for the set of IP addresses. Using the network traffic utilization data, a subset of set of IP addresses can be identified reflecting which of the IP addresses are being utilized (e.g., that have network traffic utilization over a threshold amount for a previous time period). The utilized IP addresses can be included in a routing update, which can be provided to one or more routers. For example, the routing update can add routes for IP addresses that are being utilized. The routing update can also withdraw routes for IP addresses that are not being utilized.

19 Claims, 7 Drawing Sheets

(56) References Cited

U.S. PATENT DOCUMENTS

| | | | |
|---|---|---|---|
| 7,574,495 B1* | 8/2009 | Rajagopalan | H04L 12/4641 370/392 |
| 8,189,473 B1* | 5/2012 | Breau | H04L 29/12216 370/235 |
| 9,813,374 B1* | 11/2017 | Magerramov | H04L 61/2061 |
| 2001/0025312 A1* | 9/2001 | Obata | G06F 9/5011 709/226 |
| 2002/0155827 A1* | 10/2002 | Agrawal | H04L 29/12283 455/414.1 |
| 2004/0240393 A1* | 12/2004 | Nishida | H04L 29/12047 370/253 |
| 2005/0111494 A1* | 5/2005 | Kecskemeti | H04L 29/12009 370/521 |
| 2006/0002397 A1* | 1/2006 | Xue | H04L 29/12273 370/395.2 |
| 2008/0212598 A1* | 9/2008 | Kolli | H04L 12/2856 370/409 |
| 2011/0142053 A1* | 6/2011 | Van Der Merwe | H04L 47/72 370/395.1 |
| 2011/0249682 A1* | 10/2011 | Kean | H04L 45/00 370/401 |
| 2011/0296252 A1* | 12/2011 | Maenpaa | H04L 67/104 714/48 |
| 2012/0102192 A1* | 4/2012 | Takeshima | H04L 29/12066 709/224 |
| 2016/0191457 A1* | 6/2016 | Torzillo | H04L 61/2007 709/226 |

* cited by examiner

REDUCING ROUTES BASED ON NETWORK TRAFFIC UTILIZATION

BACKGROUND

Computer networks are widely used to exchange information among computing devices. If there are problems along a path within the network (e.g., network problems, routing problems, congestion, etc.), then users of the network may experience problems accessing services provided by the network (e.g., service interruptions or slowdowns).

As networks grow, so does the need for network routing services to direct network traffic to the correct destination. In an organization that uses many individual Internet protocol (IP) addresses, routing can be difficult. For example, routing tables may grow too large to fit in the memory of the routers, which can lead to inefficient routing and the need to upgrade routing hardware. In some situations, individual routes can be combined into larger subnets. However, in other situations, individual routes cannot be combined, which puts more pressure on routing resources.

DETAILED DESCRIPTION

Figure 1:
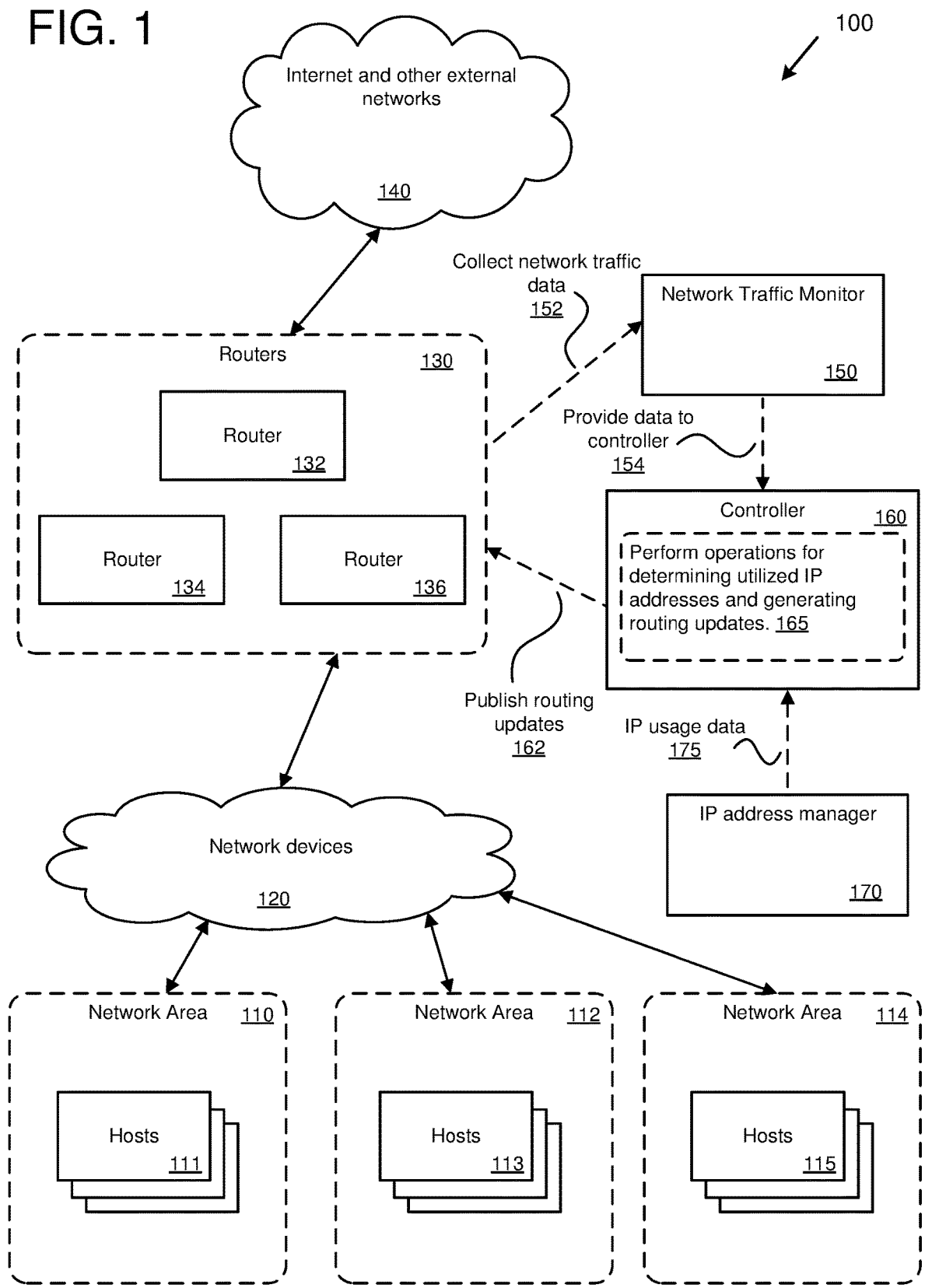
FIG. 1 is a diagram of an example network environment within which routing updates are generated based on utilized IP addresses for routing to different network areas.

The following description is directed to technologies for managing routing updates for Internet Protocol (IP) addresses based on network traffic utilization. For example, a set of IP addresses can be obtained (e.g., IP addresses that are assigned to hosts). Network traffic utilization data can be obtained for the set of IP addresses. Using the network traffic utilization data, a subset of set of IP addresses can be identified reflecting which of the IP addresses are being utilized (e.g., that have network traffic utilization over a threshold amount for a previous time period). The utilized IP addresses can be included in a routing update, which can be provided to one or more routers. For example, the routing update can add routes for IP addresses that are being utilized. The routing update can also withdraw routes for IP addresses that are not being utilized.

The technologies described herein can be used to manage IP addresses (e.g., IPv4 and/or IPv6 addresses) in relation to routing updates. IP addresses can be assigned to hosts, such as computing devices (e.g., server computers, desktop computers, laptop computers, and other types of computing devices) and/or virtual machines (e.g., virtual machine instances running within a cloud computing environment). IP addresses can be assigned to hosts either statically or dynamically. In some implementations, IP addresses are grouped together (e.g., a subnet of IP addresses, such as four IP addresses that are grouped for routing purposes into a /30 prefix subnet). In some implementations, an IP address refers to a static IP address that is assigned to a host (e.g., an IP address that does not change dynamically). IP addresses can be public IP addresses that are reachable via the Internet or private IP addresses. In some situations, an IP address that is assigned to a host is currently being utilized (e.g., a customer may assign the IP address to a virtual machine and run a web service that is frequently accessed by other users on the Internet). However, in some situations, an IP address that is assigned to a host is not currently being utilized (e.g., a customer may assign the IP address to a virtual machine that is not currently running any services and therefore not sending or receiving any network traffic).

In some implementations, IP addresses are assigned to hosts within an organization and can be quickly and efficiently reassigned to different hosts. For example, a particular customer of the organization can obtain an IP address and assign it to a first virtual server instance. If needed (e.g., upon failure of the first virtual server instance), the IP address can be quickly reassigned to a second virtual server instance associated with the customer. In order to provide quick and efficient reassigning of IP addresses, a collection of routers can manage routing for the IP addresses. For example, the collection of routers can route a specific IP address to a first network area hosting the first virtual server instance, and upon reassignment can apply a routing update to redirect the specific IP address to a second network area hosting the second virtual server instance. The procedure of reassigning IP addresses can be performed automatically and without user intervention. The procedure of reassigning IP addresses can also be performed without having to update DNS information. One example of such an IP address system in which IP addresses can be easily reassigned is the Amazon® Elastic IP service.

Routers have a limited amount of memory available to store routing information (e.g., in their forwarding information base (FIB)). If a router does not have sufficient memory to store all the desired routes, then routing efficiency can suffer (e.g., traffic that could travel along routes that are not included may have to use less efficient default routes). Routing information that involves many specific prefixes (e.g., routes for individual IP addresses, which are also called /32 prefixes) can be even more difficult to manage because they take up more space than routes that can be combined into less specific prefixes. For example, in network environments in which IP addresses can be quickly reassigned to other hosts (e.g., in different network areas), it can be more difficult to combine routes to create less specific prefixes, resulting in many specific prefixes that need correspondingly more memory to store. In addition, network environments where IP address assignment is fragmented can also result in many specific routes (e.g., individual IP address routes or routes with only a few IP addresses, such as a /30 prefix which is a subnet of four IP addresses).

Using the technologies described herein, the number of routes needed for a set of IP addresses can be reduced based on network utilization data. For example, only those IP addresses that have been utilized recently (e.g., have received network traffic over a threshold amount over the past hour) can be assigned specific routes in the routers. The other IP addresses that have not been utilized recently can be left out (i.e., they will not receive specific routes). Network traffic for the other IP addresses (that do not have specific routes) will still reach its destination, but may do so less efficiently (e.g., using default routes). Routing updates can then be generated and distributed to routes based on which IP addresses are being utilized. For example, the routing update can add routes for IP addresses that are being utilized and/or withdraw routes for IP addresses that are not being utilized. As an example, if a set of 5.8 million active IP addresses are currently assigned to hosts and it is determined that 75% of them are not being utilized (e.g., have network traffic flow below a threshold amount for the past hour), then a collection of routes may only need to store specific routes for 1.45 million of the 5.8 million active IP addresses, which can save a significant amount of computing resources (e.g., memory and processing resources of the routers).

FIG. 1 is a diagram of an example network environment 100 within which routing updates are generated based on utilized IP addresses for routing to different network areas. In the example network environment 100, a collection of routers 130 (routers 132, 134, and 136) provide routing for hosts located in different network areas. Specifically, routing is provided for IP addresses assigned to hosts 111 located in network area 110, hosts 113 located in network area 112, and hosts 115 located in network area 114. For example, the network areas can represent distinct network areas (e.g., different network areas provided within a data center). The different network areas can be isolated from one another to provide redundancy (e.g., if the hosts in one network area are affected by a network, hardware, or software problem, then the hosts in another network area can remain unaffected). The routers 130 are connected to the network areas 110, 112, and 114 via network devices 120. The network devices 120 can include routers and/or switches in various topologies (e.g., multi-tier networks). The routers 130 are also connected to the Internet and other external networks 140.

A network traffic monitor 150 is provided that collects network traffic data, as depicted at 152. The network traffic monitor 150 can be implemented via software and/or hardware resources of the network environment 100 (e.g., implemented as a software service running on one or more servers or network devices). In some implementations, the network traffic monitor 150 receives the network traffic data from the routers 130. For example, the network traffic monitor 150 can receive the network traffic data on a periodic basis (e.g., every 15 seconds) from routers 132, 134, and 136, and/or from other network devices (not depicted). In order to provide the network traffic data, the routers 130 can monitor network packet flows passing through the routers (e.g., reading IP headers) to collect network traffic data addressed to and/or from the IP addresses. In some implementations, the routers 130 collect network traffic data from a sampling of the processed network packets (e.g., one out of every 5,000 network packets).

In some implementations, the network traffic monitor 150 receives the network traffic data from the hosts directly (e.g., directly from hosts 111, 113, and 115). For example, the network traffic monitor 150 can receive the network traffic data on a periodic basis (e.g., every 15 seconds) from hosts 111, 113, and 115, and/or from other hosts (not depicted). The traffic data can be provided to the monitor 150 using an agent running on the hosts. In order to provide the network traffic data, the hosts can monitor network packets being sent and/or received via IP addresses associated with the network interfaces of the hosts, which could be related to the hosts themselves and/or to virtual machines running on the hosts. In some implementations, the hosts collect network traffic data from all network packets sent and/or received via network interfaces of the hosts.

The network traffic data comprises network traffic utilization information for IP addresses associated with the hosts (e.g., with hosts 111, 113, and 115). For example, the network traffic utilization information could indicate that a first IP address utilized 1 KB/s (one kilo-byte per second) over a previous time period (e.g., the last 15 seconds), a second IP address utilized 25 KB/s over the previous time period, and a third IP address utilized 0 KB/s over the previous time period.

The network traffic monitor 150 provides the network traffic data to the controller 160, as depicted at 154. For example, the network traffic data can be provided to the controller 160 on a periodic basis (e.g., every 15 seconds the network traffic data can be updated and provided to the controller 160 indicating IP address bandwidth utilization over the past 15 seconds). In some implementations, the controller 160 polls the network traffic monitor 150 for the network traffic data.

The controller 160 manages routing updates for IP addresses based on network traffic utilization. For example, as depicted at 165 the controller 160 can perform operations for determining utilized IP addresses and generating routing updates that are then provided to the routers 130. The controller 160 can be implemented via software and/or hardware resources of the network environment 100 (e.g., implemented as a software service running on one or more servers or network devices). In some implementations, the controller 160 receives information about the IP addresses (as depicted at 175) from an IP address manager 170. For example, the IP usage data can indicate a set of IP addresses that are currently associated with the hosts (e.g., with hosts 111, 113, and 115), which are also called active IP addresses. The IP address manager 170 can be implemented via software and/or hardware resources of the network environment 100. In some implementations, the IP address manager manages 170 assignment of IP addresses to the various hosts (e.g., to virtual machine instances running on the hosts). For example, the IP address manager 170 can assign IP addresses to virtual machine instances in response to customer requests.

For example, the controller 160 can identify a set of IP addresses that are assigned to hosts (e.g., to hosts 111, 113, and 115) using the IP usage data obtained from the IP address manager 170. The controller 160 can determine a subset of utilized IP addresses from the set of IP addresses based on network traffic data obtained from the network traffic monitor 150. The controller 160 can reduce the set of IP addresses by removing IP addresses from the set of IP addresses that are not in the subset of utilized IP addresses. For example, the controller 160 can remove IP addresses that are not being utilized at all (e.g., that utilize 0 KB/s for the previous time period) or that utilized less than a threshold amount of bandwidth (e.g., utilized less than 1 KB/s for the previous time period). The controller 160 can generate a routing update that comprises the reduced set of IP addresses and provide the routing update to the routers (e.g., to routers 130), as depicted at 162. For example, the routing update can comprise instructions for adding routes for the IP addresses (e.g., individual IP addresses and/or groups of IP addresses organized into a subnet) that are being used. The routing update can also comprise instructions for withdrawing routes for the IP addresses (e.g., individual IP addresses and/or groups of IP addresses organized into a subnet) that are not being used.

In some implementations, the routers 130 perform routing for utilized IP addresses in a more efficient manner than for IP addresses that are not utilized. For example, the routers 130 use specific routes for utilized IP addresses such that the utilized IP addresses are routed directly to their respective network areas. For example, network traffic for a utilized IP address (e.g., a /32 prefix route) that is associated with one of the hosts 111 in network area 110 can be routed directly to network area 110 (e.g., by routers 132, 134, and 136). On the other hand, if an IP address associated with one of the hosts 113 is not being utilized it will not have a direct route (e.g., it will not have a specific /32 prefix route) in the routers 130. However, the IP address that is not being utilized will still be routable. For example, the routers 130 can use a default route spread network traffic among the network areas (e.g., send network packets to network areas 110, 112, and 114) for IP addresses that do not have more specific routes. The routers 130 could also use a default route that sends such network traffic to one of the network areas (e.g., to network area 114) which then forwards network traffic to one of the other network areas if needed (e.g., to network area 112 for an IP address assigned to one of the hosts 113).

Figure 2:
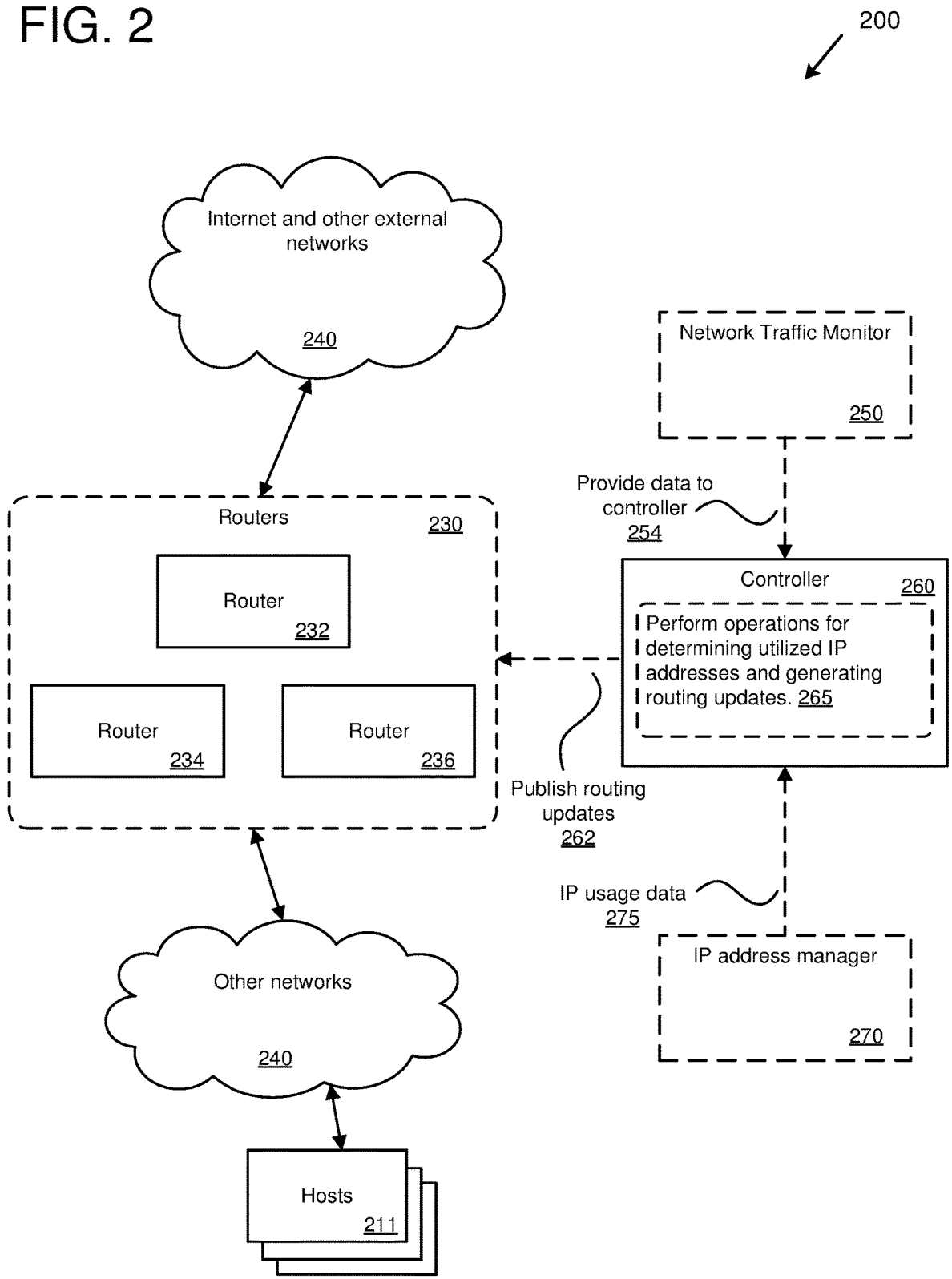
FIG. 2 is a diagram of an example network environment within which routing updates are generated based on which IP addresses are being utilized.

FIG. 2 is a diagram of an example network environment 200 within which routing updates are generated based on which IP addresses are being utilized. In the example network environment 200, a collection of routers 230 (routers 232, 234, and 236) provide routing for hosts located in other networks 240 (e.g., other local area networks, such as other networks within a data center). Specifically, routing is provided for IP addresses assigned to hosts 211. The other networks 240 can include routers and/or switches in various topologies (e.g., multi-tier networks). The routers 230 are also connected to the Internet and other external networks 240.

In some implementations, a network traffic monitor 250 is provided that collects network traffic data. The network traffic monitor 250 can be implemented via software and/or hardware resources of the network environment 200 (e.g., implemented as a software service running on one or more servers or network devices). In some implementations, the network traffic monitor 250 receives the network traffic data from the routers 230. For example, the network traffic monitor 250 can receive the network traffic data on a periodic basis (e.g., every 15 seconds) from routers 232, 234, and 236, and/or from other network devices (not depicted). In order to provide the network traffic data, the routers 230 can monitor network packet flows passing through the routers (e.g., reading IP headers) to collect network traffic data addressed to and/or from the IP addresses. In some implementations, the routers 230 collect network traffic data from a sampling of the processed network packets (e.g., one out of every 5,000 network packets).

In some implementations, the network traffic monitor 250 receives the network traffic data from the hosts directly (e.g., directly from hosts 211). For example, the network traffic monitor 250 can receive the network traffic data on a periodic basis (e.g., every 15 seconds) from hosts 211, and/or from other hosts (not depicted). In order to provide the network traffic data, the hosts can monitor network packets being sent and/or received via IP addresses associated with the network interfaces of the hosts, which could be related to the hosts themselves and/or to virtual machines running on the hosts. In some implementations, the hosts collect network traffic data from all network packets sent and/or received via network interfaces of the hosts.

The network traffic data comprises network traffic utilization information for IP addresses associated with the hosts (e.g., with hosts 211). For example, the network traffic utilization information could indicate that a first IP address utilized 1 KB/s over a previous time period (e.g., the last 15 seconds), a second IP address utilized 25 KB/s over the previous time period, and a third IP address utilized 0 KB/s over the previous time period.

The network traffic monitor 250 provides the network traffic data to the controller 260, as depicted at 254. For example, the network monitoring data can be provided to the controller 260 on a periodic basis (e.g., every 15 seconds the network monitoring data can be updated and provided to the controller 260 indicating IP address bandwidth utilization over the past 15 seconds). In some implementations, the controller 260 polls the network traffic monitor 250 for the network traffic data.

The controller 260 manages routing updates for IP addresses based on network traffic utilization. For example, as depicted at 265 the controller 260 can perform operations for determining utilized IP addresses and generating routing updates that are then provided to the routers 230. The controller 260 can be implemented via software and/or hardware resources of the network environment 200 (e.g., implemented as a software service running on one or more servers or network devices). In some implementations, the controller 260 receives information about the IP addresses (as depicted at 275) from an IP address manager 270. For example, the IP usage data can indicate a set of IP addresses that are currently associated with the hosts (e.g., with hosts 211), which are also called active IP addresses.

For example, the controller 260 can identify a set of IP addresses that are assigned to hosts (e.g., to hosts 211). The controller 260 can determine which of the set of IP addresses are being utilized based at least in part on network traffic utilization (e.g., based on network traffic data received from the network traffic monitor 250). The controller 260 can generate a routing update that adds routes for the IP addresses (e.g., individual IP addresses and/or groups of IP addresses organized into a subnet) that are utilized and provide the routing update to the routers (e.g., to routers 230), as depicted at 262. In some implementations, the routing update includes commands to withdraw routes for IP addresses (e.g., individual IP addresses and/or groups of IP addresses organized into a subnet) that are not being utilized.

In some implementations, network traffic utilization information is maintained (e.g., by a controller, such as controller 160 or 260) for the IP addresses and used to indicate which IP addresses are utilized and/or not utilized. For example, when an IP address that has not previously been utilized begins sending and/or receiving data, it will show up in a network traffic data update (e.g., as depicted at 154 and 254). When the controller receives the network traffic update, it can evaluate the network traffic data for the IP address and add it to a utilized list (e.g., if it has utilized more than a threshold amount of network traffic). In this way, when IP addresses begin to be utilized, they can be quickly added to the utilized list (e.g., within 15 seconds if the network traffic data is received every 15 seconds) and provided in routing updates (e.g., which can also be provided to the routers on a periodic basis, such as every 15 seconds). When network traffic utilization for an IP address that has been previously utilized (e.g., that is already present in the network traffic utilization information) stops or drops below a threshold value, then the IP address can be removed as a utilized IP address or otherwise indicated as not being utilized. In some implementations, an IP address that was previously being utilized will retain its utilized status for a period of time. For example, a previously utilized IP address can retain its utilized status (e.g., and be included in routing updates as an active route) for one hour after it stopped sending and/or receiving traffic or fell below a traffic threshold. Using this procedure, IP addresses that being (or increase) their traffic utilization are quickly added to the routing updates (e.g., within a relatively short period of time, such as 15 or 30 seconds) while IP addresses that stop (or reduce below a threshold) their traffic utilization remain active for a longer period of time before being removed from the routing updates or withdrawn as active routes (e.g., after a relatively long period of time, such as 1 or 2 hours).

In some implementations, the routers (e.g., routers 130 and 230) operate using border gateway protocol (BGP). In this situation, the controllers (e.g., controllers 160 and 260) send BGP routing updates to the routers (e.g., comprising destination prefixes and next hops). The BGP routing updates can include routes to be added (e.g., for IP addresses that are being utilized) and/or routes to be withdrawn (e.g., for IP addresses that are not being utilized). In other implementations, the routers (e.g., routers 130 and 230) operate using one or more routing protocols other than, or in addition to, BGP.

In some implementations, the controller (e.g., controller 160 or 260) performs the operations that would otherwise be performed by the network traffic monitor (e.g., network traffic monitor 150 or 250) and/or the IP address manager (e.g., IP address manager 170 or 270). For example, the controller can obtain network traffic data from the routers and/or from the hosts.

In some implementations, IP addresses are aggregated in order to reduce the number of routing entries (e.g., to reduce the number of individual routes). For example, if four individual IP addresses are contiguous, then they can be combined into a larger subnet (e.g., as a /30 prefix subnet), which only requires one routing entry instead of four individual routing entries. In some implementations, aggregating routing entries also depends on where the individual IP addresses are assigned (e.g., if they are all assigned to hosts in the same network area, they can be aggregated).

In some implementations, aggregation is performed on a set of IP addresses before they are filtered based on which are being utilized. For example, a set of IP addresses can be aggregated by combining IP addresses into larger subnets. After, the set of IP addresses can be examined to determine which are being utilized. Those IP addresses that are not being utilized (which could be individual IP addresses, or groups of IP addresses where all IP addresses in a subnet are not being utilized) can be filtered out and not included in a routing update or indicated as withdrawn.

In some implementations, aggregation is performed on a reduced set of IP addresses after they have been filtered to remove those that are not being utilized. For example, a reduced set of IP addresses can be aggregated by combining IP addresses into larger subnets.

In some implementations, only individual IP addresses (those with a /32 prefix) are eligible for aggregation. In some implementations, individual as well as groups of IP addresses are eligible for aggregation.

Figure 3:
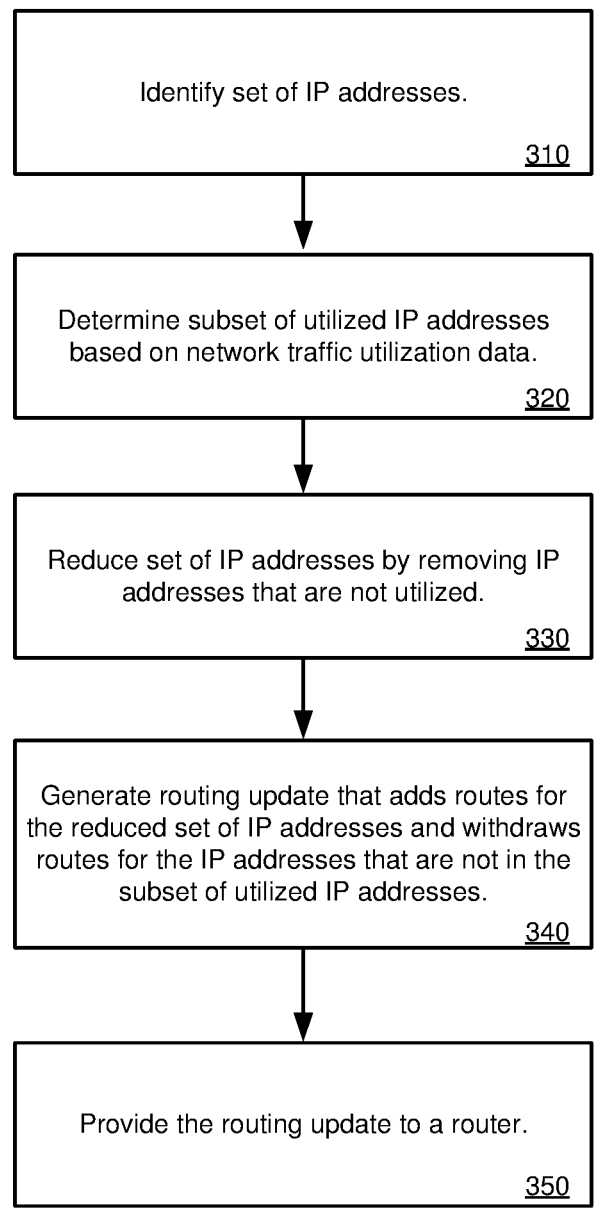
FIGS. 3, 4, and 5 are flowcharts of example methods for managing routing updates for IP addresses based on network traffic utilization.

FIG. 3 is a flow chart of an example method 300 for managing routing updates for IP addresses based on network traffic utilization. For example, the example method 300 can be performed by a controller, such as controller 160 or controller 260.

At 310, a set of IP addresses is identified. The set of IP addresses are active IP addresses that are currently assigned to hosts. For example, the set of IP addresses can be received from a service that maintains a list of IP addresses (e.g., from an IP address manager service).

At 320, a subset of utilized IP addresses from the set of IP addresses is determined based on network traffic utilization data. For example, the set of IP addresses can be analyzed to determine which of them are currently being utilized. In some implementations, IP addresses that used more than a threshold amount of network traffic over a previous time period (e.g., more than 1 KB/s over the past 15 seconds) are considered to be utilized. In some implementations, if an IP address used any amount of network traffic (i.e., a threshold of zero) over the previous time period it is considered to be utilized. In addition, previously utilized IP addresses (e.g., those that had network traffic over a threshold value in older time periods) can still be considered utilized for a period of time (e.g., for a number of hours, such as two hours).

At 330, the set of IP addresses is reduced by removing IP addresses from the set that are not utilized (e.g., by removing IP addresses that are not in the subset of utilized IP addresses). In this way the set of IP addresses is filtered to remove those IP addresses from the set that are not being utilized. In some implementations, a different time period is used to determine when an IP address is no longer being utilized. For example, an IP address that was recently utilized may need to be unutilized for a relatively long period of time (e.g., a number of hours) before it is considered not utilized (e.g., and withdrawn as a specific route).

At 340, a routing update is generated for advertising to a router. The routing update adds routes for the reduced set of IP addresses, which are the IP addresses that are being utilized. The routing update also withdraws routes for the IP addresses that are not in the subset of utilized IP addresses, which are the IP addresses that are not being utilized.

At 350, the routing update is provided to a router. For example, the routing update can be published to a collection of routers which then update their routing tables based on the routing update.

Figure 4:
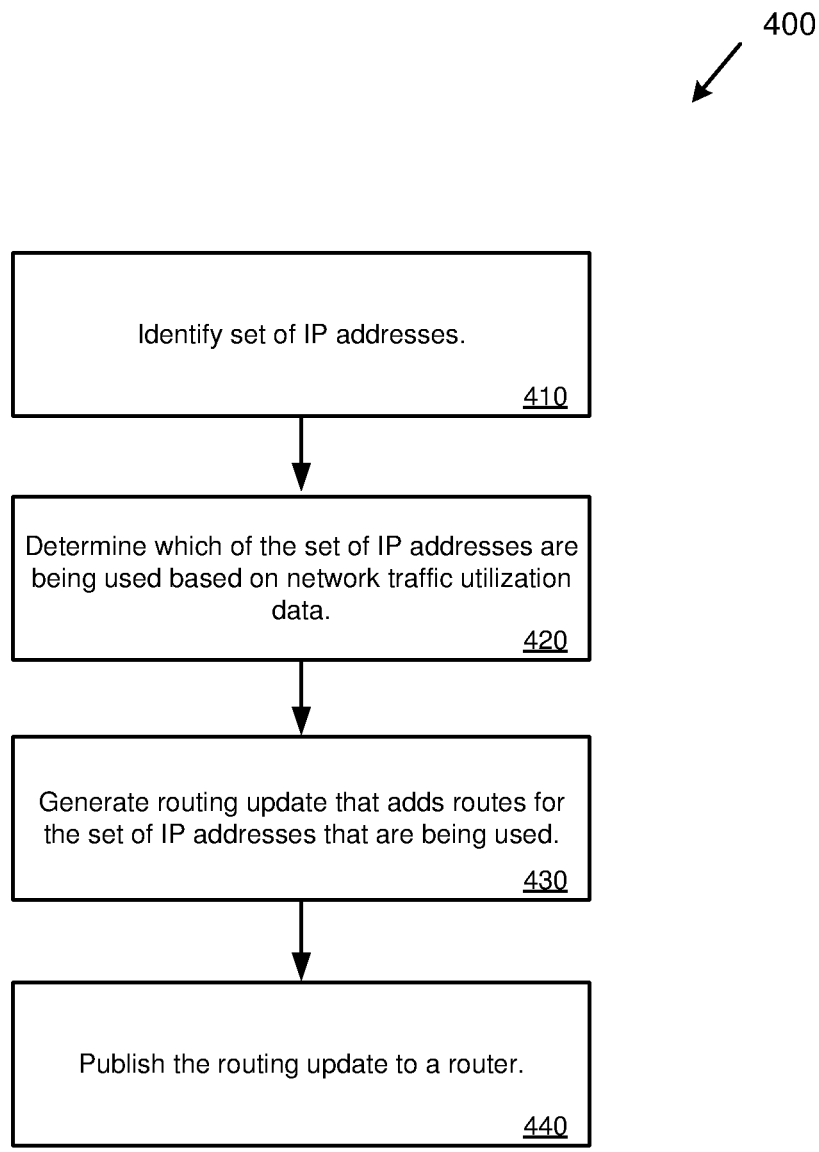

FIG. 4 is a flow chart of an example method 400 for managing routing updates for IP addresses based on network traffic utilization. In the example method 400, a set of IP addresses is analyzed to determine which are being used based on network traffic utilization data. The IP addresses that are being used are then published to routers in a routing update. For example, the example method 400 can be performed by a controller, such as controller 160 or controller 260.

At 410, a set of IP addresses is identified. The set of IP addresses are active IP addresses that are currently assigned to hosts. For example, the set of IP addresses can be received from a service that maintains a list of IP addresses (e.g., from an IP address manager service).

At 420, a determination is made as to which of the set of IP addresses are being used based at least in part on network traffic utilization data. For example, the set of IP addresses can be analyzed to determine which of them are currently being used (currently being utilized). In some implementations, IP addresses that used more than a threshold amount of network traffic over a previous time period (e.g., more than 1 KB/s over the past 15 seconds) are considered to be used. In some implementations, if an IP address used any amount of network traffic (i.e., a threshold of zero) over the previous time period it is considered to be used. In addition, previously utilized IP addresses (e.g., those that had network traffic over a threshold value in older time periods) can still be considered used for a period of time (e.g., for a number of hours, such as two hours).

At 430, a routing update is generated that adds routes for the set of IP addresses that are being used. In some implementations, the routing update also includes instructions to withdraw routes for IP addresses that are not being used.

At 440, the routing update is published to a router. For example, the routing update can be published to a collection of routers which then update their routing tables based on the routing update.

Figure 5:
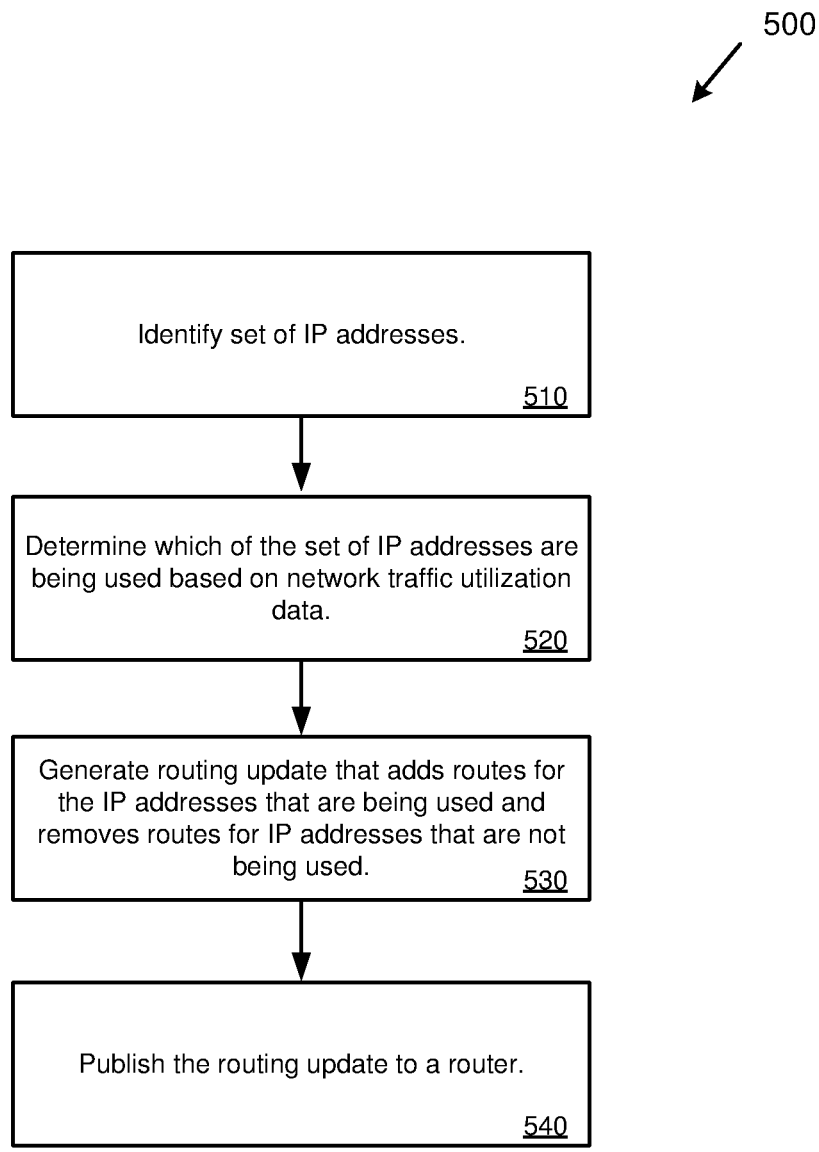

FIG. 5 is a flow chart of an example method 500 for managing routing updates for IP addresses based on network traffic utilization. In the example method 500, a set of IP addresses is analyzed to determine which are being used based on network traffic utilization data. A routing update is then generated which includes routes to be added (for IP addresses being used) and routes to be removed (for IP addresses that are not being used). For example, the example method 500 can be performed by a controller, such as controller 160 or controller 260.

At 510, a set of IP addresses is identified. The set of IP addresses are active IP addresses that are currently assigned to hosts. For example, the set of IP addresses can be received from a service that maintains a list of IP addresses (e.g., from an IP address manager service).

At 520, a determination is made as to which of the set of IP addresses are being used based at least in part on network traffic utilization data. For example, the set of IP addresses can be analyzed to determine which of them are currently being used (currently being utilized). In some implementations, IP addresses that used more than a threshold amount of network traffic over a previous time period (e.g., more than 1 KB/s over the past 15 seconds) are considered to be used. In some implementations, if an IP address used any amount of network traffic (i.e., a threshold of zero) over the previous time period it is considered to be used. In addition, previously utilized IP addresses (e.g., those that had network traffic over a threshold value in older time periods) can still be considered used for a period of time (e.g., for a number of hours, such as two hours).

At 530, a routing update is generated that adds routes for the IP addresses that are being used and removes (e.g., withdraws) routes for the IP addresses that are not being used (e.g., that had network traffic over a threshold value more than two hours ago).

At 540, the routing update is published to a router. For example, the routing update can be published to a collection of routers which then update their routing tables based on the routing update.

Figure 6:
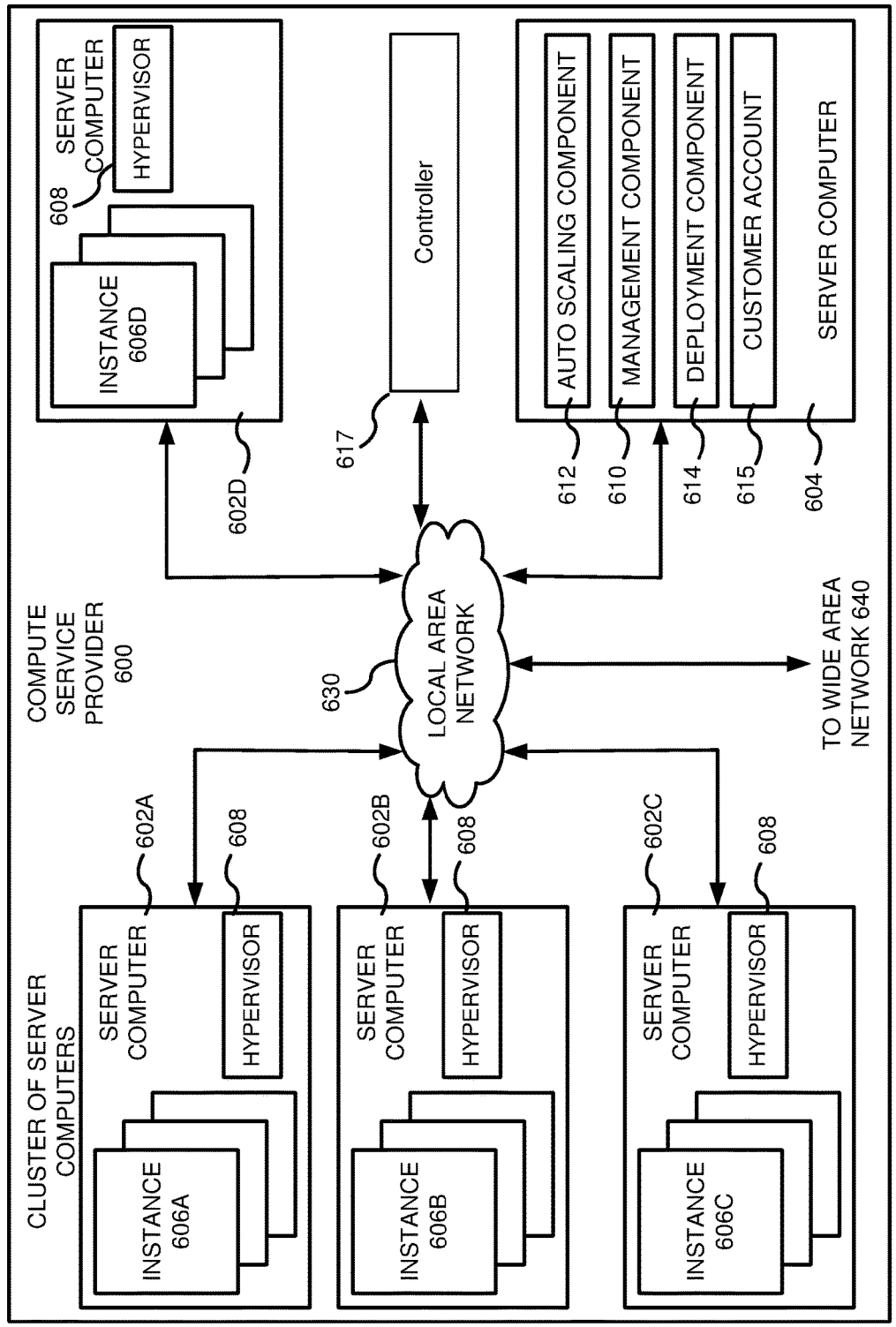
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise a Clos network. The network 630 can be a local area network (LAN), such as a multi-tiered network (e.g., Clos network), and can be connected to a wide area network (WAN) 640 so that end users can access the compute service provider 600. The wide area network 640 can connect to a border network fabric providing access to the internet and/or to other networks (e.g., peering connections to other network locations). It should be appreciated that the network topology illustrated in FIG. 6 has been simplified and that many more networks and networking devices can be utilized to interconnect the various computing systems disclosed herein.

In some implementations, a controller 617 manages IP addresses and generates routing updates. For example, the controller 617 can obtain network utilization data related to IP addresses assigned to the server computers 602A-602D and/or to the instances 606A-606D. The controller 617 can determine which of the IP addresses are being utilized. The controller 617 can generate routing updates indicating which of the IP addresses are being utilized (e.g., for adding specific routes) and/or which of the IP addresses are not being utilized (e.g., for withdrawing specific routes).

Figure 7:
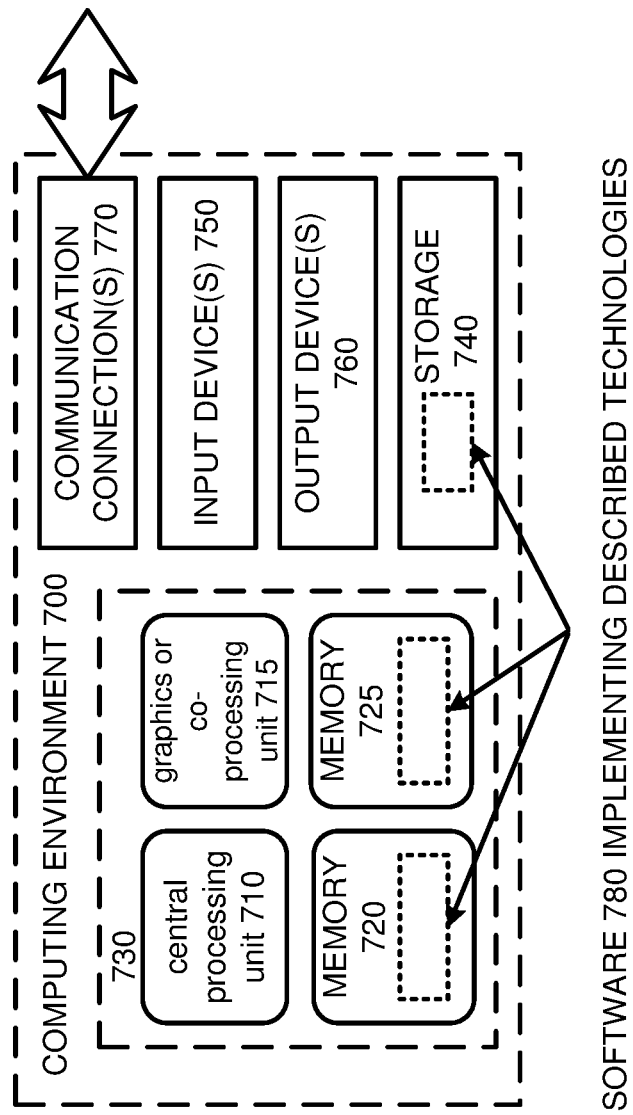
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A system, comprising a processing unit and a network interface, the system comprising:
   a controller that is configured to perform operations comprising:
      identifying a set of Internet Protocol (IP) addresses that are assigned to host computing devices;
      determining a subset of utilized IP addresses from the set of IP addresses, wherein the utilized IP addresses are determined based on network traffic utilization data for the set of IP addresses by the host computing devices;
      reducing the set of IP addresses by removing IP addresses that are not in the subset of utilized IP addresses;
      generating a routing update for advertising to a router, wherein the routing update:
         adds specific routes for the reduced set of IP addresses; and
         withdraws specific routes for the IP addresses that are not in the subset of utilized IP addresses, wherein the IP addresses that are not in the subset of utilized IP addresses remain assigned to the host computing devices after the specific routes are withdrawn;
         wherein a specific route is a route for one or more IP addresses that routes network traffic directly to a given network area; and
      providing the routing update to the router.

2. The system of claim 1, the operations further comprising:
   performing route aggregation on the reduced set of IP addresses, wherein the route aggregation comprises combining IP addresses into larger subnets.

3. The system of claim 1, wherein the subset of utilized IP addresses is determined to be IP addresses associated with hosts that used more than a threshold amount of network traffic over a previous time period.

4. The system of claim 1, further comprising:
   a network traffic monitor that is configured to perform operations comprising:
      collecting network traffic utilization data from a collection of routers; and
      providing the network traffic utilization data to the controller.

5. The system of claim 1, further comprising:
   an IP address manager that is configured to perform operations comprising:
      maintaining IP usage data for the host computing devices; and
      based on the IP usage data, providing the set of IP addresses to the controller.

6. A computing device comprising:
   a processing unit; and
   a network interface;
   wherein the computing device is configured to perform operations, the operations comprising:
      identifying a set of Internet Protocol (IP) addresses that are assigned to hosts;
      determining which of the set of IP addresses are being used based on network traffic utilization data for the set of IP addresses by the hosts;
      generating a routing update that:

adds specific routes for the set of IP addresses that are being used; and withdraws specific routes for the IP addresses that are not being used, wherein the IP addresses that are not being used remain assigned to the hosts after the specific routes are withdrawn;

wherein a specific route is a route for one or more IP addresses that routes network traffic directly to a given network area; and publishing the routing update to a router.

7. The computing device of claim 6, the operations further comprising:

performing route aggregation on the used IP addresses, wherein the route aggregation comprises combining IP addresses into larger subnets.

8. The computing device of claim 6, the operations further comprising:

performing route aggregation on the identified set of IP addresses, wherein the route aggregation comprises combining IP addresses into larger subnets.

9. The computing device of claim 6, wherein the used IP addresses are determined to be IP addresses associated with hosts that used more than a threshold amount of network traffic over a previous time period.

10. The computing device of claim 6, wherein determining which of the set of IP addresses are being used comprises:

if an IP address used more than a threshold amount of network traffic over a first time period, including an entry in the routing update to add a specific route for the IP address; and otherwise, if the IP address did not use more than the threshold amount of network traffic over a second time period, including an entry in the routing update to withdraw a specific route for the IP address;

wherein the first time period is shorter than the second time period.

11. The computing device of claim 6, wherein the IP addresses are public IP addresses that are reachable via the Internet.

12. A method, implemented by a computing device, the method comprising:

identifying a set of Internet Protocol (IP) addresses that are assigned to hosts;

determining which of the set of IP addresses are used based on network traffic utilization data for the set of IP addresses by the hosts, wherein the used IP addresses are determined to be IP addresses associated with hosts that used more than a threshold amount of network traffic over a previous time period;

generating a routing update that is usable by a router to:

add specific routes for the IP addresses that are used; and remove specific routes for the IP addresses that are not used, wherein the IP addresses that are not used remain assigned to the hosts after the specific routes are removed;

wherein a specific route is a route for one or more IP addresses that routes network traffic directly to a given network area; and publishing the routing update to a router.

13. The method of claim 12, wherein the routing update does not include routes for the IP addresses that are not being used.

14. The method of claim 12, wherein the routing update withdraws routes for the IP addresses that are not being used.

15. The method of claim 12, further comprising:

performing route aggregation on the used IP addresses, wherein the route aggregation comprises combining IP addresses into larger subnets.

16. The method of claim 12, further comprising:

performing route aggregation on the identified set of IP addresses, wherein the route aggregation comprises combining IP addresses into larger subnets.

17. The method of claim 12, wherein the threshold amount is zero.

18. The method of claim 12, wherein the network traffic utilization data is obtained from a collection of routers that provide routing services for the hosts.

19. The system of claim 1, wherein the IP addresses that are not in the subset of utilized IP addresses are routable using default routes.

* * * * *